(12) United States Patent
Saratani

(10) Patent No.: US 9,591,155 B2
(45) Date of Patent: Mar. 7, 2017

(54) IMAGE FORMING APPARATUS ACCEPTING AN INSTRUCTION INDICATING A SHIFT KEY HAS BEEN SELECTED FROM A MOBILE DEVICE

(71) Applicant: KYOCERA Document Solutions Inc., Osaka (JP)

(72) Inventor: Ken Saratani, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 14/853,376

(22) Filed: Sep. 14, 2015

(65) Prior Publication Data

US 2016/0088173 A1 Mar. 24, 2016

(30) Foreign Application Priority Data

Sep. 19, 2014 (JP) ................................ 2014-191503

(51) Int. Cl.
*H04N 1/00* (2006.01)
*H04N 1/32* (2006.01)

(52) U.S. Cl.
CPC ..... *H04N 1/00392* (2013.01); *H04N 1/00307* (2013.01); *H04N 1/00493* (2013.01); *H04N 1/32512* (2013.01); *H04N 2201/0094* (2013.01)

(58) Field of Classification Search
CPC .............. G06F 3/1292; H04N 1/00392; H04N 1/00493; H04N 1/32512
USPC ................................................ 358/1.13, 1.15
See application file for complete search history.

(56) References Cited

U.S. PATENT DOCUMENTS

| 2013/0174079 | A1 | 7/2013 | Morley et al. |
| 2013/0293607 | A1* | 11/2013 | Kaiba ................. B41J 2/04503 347/9 |
| 2015/0103376 | A1* | 4/2015 | Saeda .................. G06F 3/1253 358/1.15 |

FOREIGN PATENT DOCUMENTS

JP 2013-526171 A 6/2013

\* cited by examiner

*Primary Examiner* — Eric A Rust
(74) *Attorney, Agent, or Firm* — IP Business Solutions, LLC

(57) ABSTRACT

An information processing apparatus includes a display section, a touch panel, an acceptance section, a communication section, and a communication control section. The display section is capable of displaying a first operating image in which a plurality of first operating keys are arranged. The communication section is capable of communicating with a mobile terminal device capable of displaying a second operating image in which one or more second operating keys operable in combination with the first operating keys are arranged. The communication control section allows the communication section to receive from the mobile terminal device operating information indicating that one of the second operating keys has been selected. When the one first operating key is selected while the communication section receives the operating information, the acceptance section accepts an instruction corresponding to a combination of the selected first operating key and the second operating key indicated in the operating information.

1 Claim, 8 Drawing Sheets

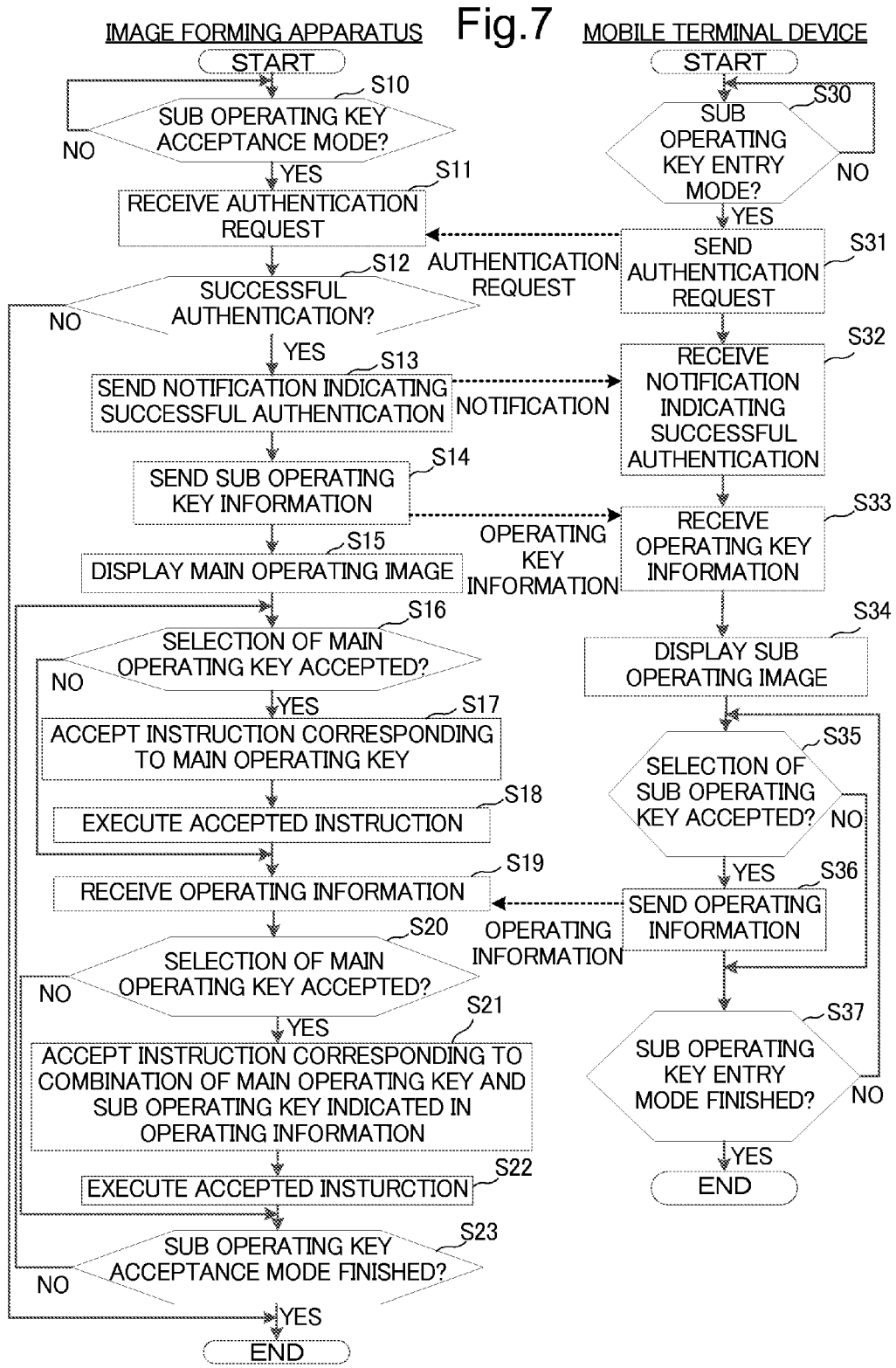

IMAGE FORMING APPARATUS ACCEPTING AN INSTRUCTION INDICATING A SHIFT KEY HAS BEEN SELECTED FROM A MOBILE DEVICE

INCORPORATION BY REFERENCE

This application claims priority to Japanese Patent Application No. 2014-191503 filed on Sep. 19, 2014, the entire disclosure of which are incorporated herein by reference.

BACKGROUND

The present disclosure relates to information processing apparatuses, mobile terminal devices, and information processing systems and particularly relates to a technique for accepting an instruction relating to processing executable on an information processing apparatus.

Information processing apparatuses, such as image forming apparatuses, are provided with a display section on which an operating image for use in user's operations is displayed. A touch panel is disposed in front of the display section of such an information processing apparatus. A user selects, by a touch gesture on the touch panel, one of operating keys (main operating keys), such as character entry keys, arranged in the operating image for the entry of various instructions to the information processing apparatus.

The operating keys arranged in the operating image include not only the main operating keys, such as character entry keys, but also other operating keys (sub operating keys), such as a shift key and a control key, operable in combination with another operating key. A technique (general technique A) is known in which a group of main operating keys and a group of sub operating keys are arranged in different operating images and, upon acceptance of a slide gesture on the operating image containing the group of main operating keys, the display is switched from the operating image containing the group of main operating keys to the operating image containing the group of sub operating keys. The separation between the group of main operating keys and the group of sub operating keys enables larger display of the main operating keys and sub operating keys, which improves the visibility and operability of the main and sub operating keys. Furthermore, the display section of the information processing apparatus can be reduced in size while ensuring sufficient size of the main and sub operating keys. This reduces the production cost of the information processing apparatus.

SUMMARY

A technique improved over the aforementioned technique is proposed as one aspect of the present disclosure.

An information processing apparatus according to an aspect of the present disclosure includes a display section, a touch panel, an acceptance section, a communication section, and a communication control section. The display section is capable of displaying a first operating image in which a plurality of first operating keys are arranged. The touch panel is disposed in front of the display section. The acceptance section is configured to accept, based on a touch gesture on the touch panel, an instruction relating to processing executable on the information processing apparatus. The communication section is capable of communicating with a mobile terminal device capable of displaying a second operating image in which a second operating key operable in combination with the first operating keys is disposed, the mobile terminal device capable of accepting a touch gesture thereon. The communication control section is configured to control a communication operation of the communication section. The communication control section is further configured to allow the communication section to receive from the mobile terminal device operating information indicating that the second operating key has been selected by the touch gesture on the mobile terminal device. The acceptance section is further configured to, when one of the first operating keys is selected by the touch gesture on the touch panel while the communication section has not received the operating information, accept the instruction corresponding to the selected first operating key and, when one of the first operating keys is selected by the touch gesture on the touch panel while the communication section receives the operating information, accept the instruction corresponding to a combination of the selected first operating key and the second operating key indicated in the operating information.

Furthermore, a mobile terminal device according to another aspect of the present disclosure includes a communication section, a communication control section, a display section, a display control section, a touch panel, and an acceptance section. The communication section is capable of communicating with an information processing apparatus capable of displaying a first operating image in which a plurality of first operating keys each for use in accepting an instruction relating to processing executable on the information processing apparatus are arranged, the information processing apparatus capable of accepting a touch gesture thereon. The communication control section is configured to control a communication operation of the communication section. The display section is configured to display a second operating image in which one or more second operating keys operable in combination with the first operating keys are arranged. The display control section is configured to control a display operation of the display section. The touch panel is disposed in front of the display section. The acceptance section is configured to accept, based on a touch gesture on the touch panel, a selection of one of the one or more second operating keys. The communication control section is further configured to, when the acceptance section accepts the selection of the one second operating key, allow the communication section to send to the information processing apparatus operating information indicating that the one second operating key has been selected.

Moreover, an information processing system according to still another aspect of the present disclosure includes the above-described information processing apparatus and the above-described mobile terminal device.

BRIEF DESCRIPTION OF THE DRAWINGS

FIG. 7 is a flowchart showing operation flows of the image forming apparatus and the mobile terminal device according to the one embodiment of the present disclosure.

DETAILED DESCRIPTION

Figure 1:
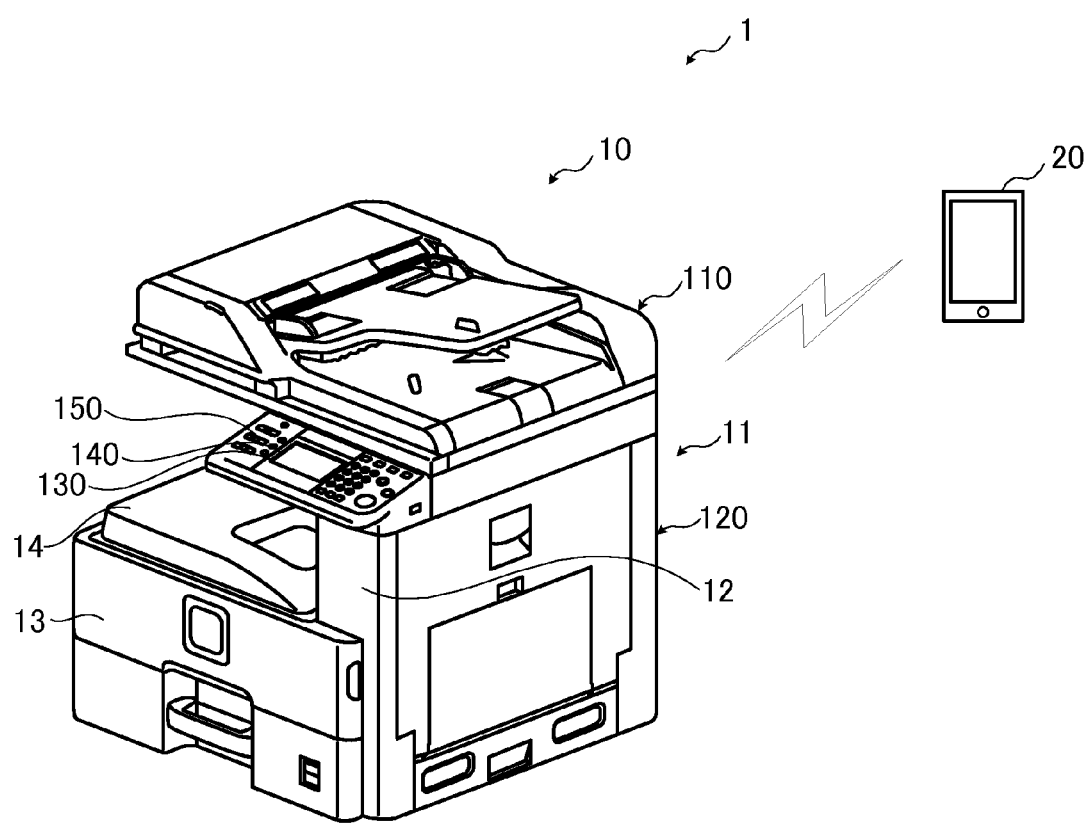
FIG. 1 is a perspective view showing the configuration of an information processing system according to one embodiment of the present disclosure.
Figure 2:
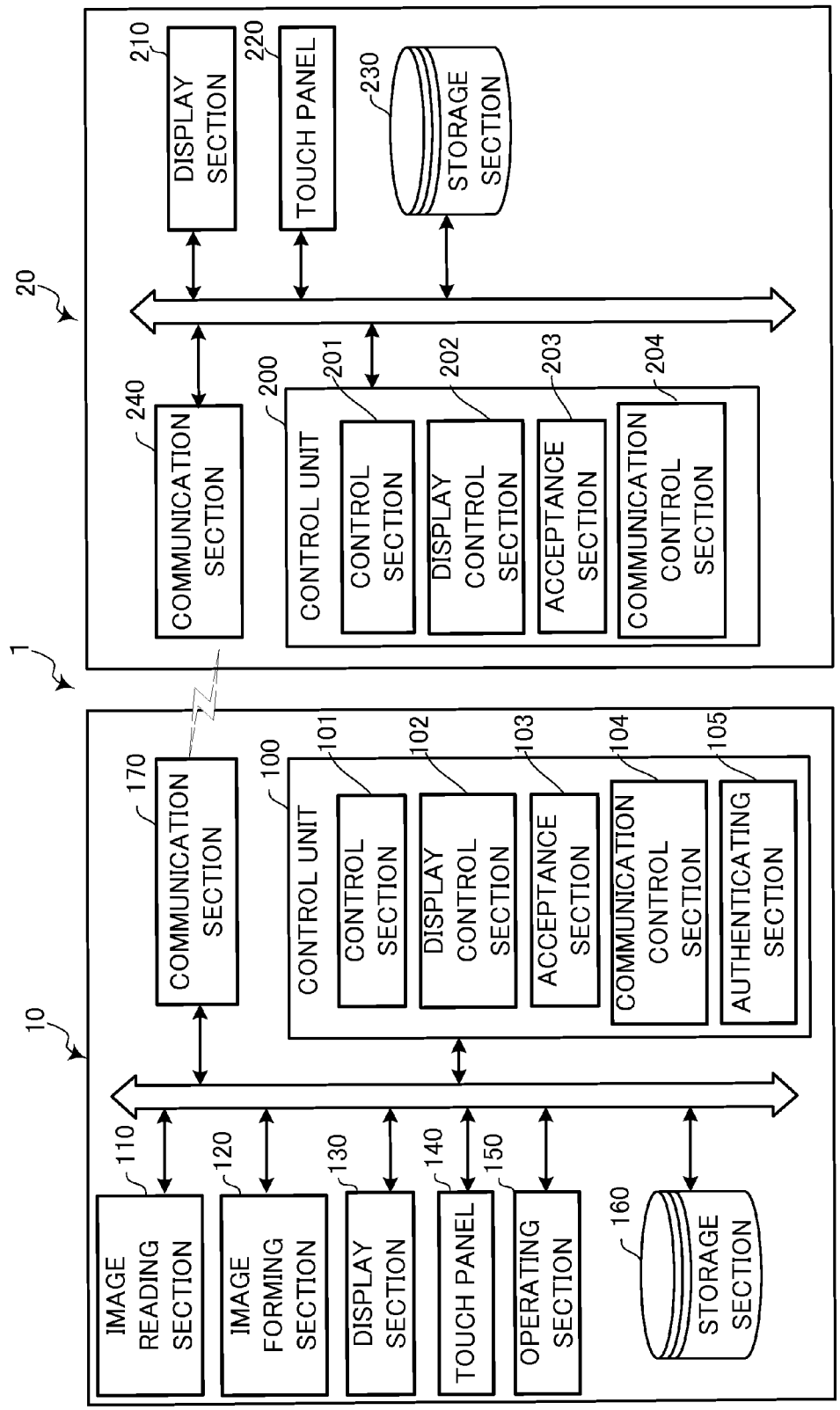
FIG. 2 is a block diagram showing an internal configuration of the information processing system according to the one embodiment of the present disclosure.

Hereinafter, a description will be given of an information processing apparatus, a mobile terminal device, and an information processing system according to one embodiment of the present disclosure with reference to the drawings. FIG. 1 is a perspective view showing the configuration of the information processing system according to the one embodiment of the present disclosure. FIG. 2 is a block diagram showing an internal configuration of the information processing system according to the one embodiment of the present disclosure.

The information processing system 1 includes an image forming apparatus 10 as an example of the information processing apparatus and a mobile terminal device 20 capable of communicating with the image forming apparatus 10. First, a description will be given of the structure and configuration of the image forming apparatus 10.

The image forming apparatus 10 is a multifunction peripheral having multiple functions including, for example, a copy function, a print function, a scan function, and a facsimile function. The image forming apparatus 10 is roughly composed of an apparatus body 11, an image reading section 110 disposed above the apparatus body 11, and a connecting portion 12 provided between the image reading section 110 and the apparatus body 11.

The apparatus body 11 is made up to include an image forming section 120, a sheet feed section 13, and so on.

In an image forming operation of the image forming apparatus 10, the image forming section 120 forms a toner image on a recording paper sheet fed from the sheet feed section 13 based on an image read by the image reading section 110 or other images. Thereafter, the toner image formed on the recording paper sheet is heat fixed by an unshown fixing section. The recording paper sheet having an image fixed thereon by the completion of the fixing is discharged to a sheet output tray 14.

A display section 130 and an operating section 150 are disposed at the front of a housing forming a shell of the image forming apparatus 10. The display section 130 is formed to include a liquid crystal display (LCD) or an organic light-emitting diode (OLED) display. The display section 130 is configured to, under the control of a display control section 102 to be described hereinafter, display a main operating image (first operating image) in which a plurality of main operating keys (first operating keys) are arranged as soft keys or other images.

A touch panel 140 is disposed in front of the display section 130. The touch panel 140 is a touch panel of, for example, a so-called resistive film system or a capacitance system and is configured to detect a user's touch of the touch panel 140 together with the point of touch. When detecting the user's touch, the touch panel 140 outputs a signal indicating a coordinate point of the point of touch to a hereinafter described acceptance section 103 and so on.

The operating section 150 is hard keys including, for example, a menu key for calling up a menu, arrow keys for moving the focus of a GUI forming the menu, a determination key for performing a determination operation for the GUI forming the menu, and so on.

A storage section 160 is a large storage device, such as an HDD (hard disk drive).

A communication section 170 is a network interface composed of a communication module, such as a wireless LAN board.

The image forming apparatus 10 further includes a control unit 100. The control unit 100 is composed of a CPU (central processing unit), a RAM (random access memory), a ROM (read only memory), and so on. When an information processing apparatus control program stored in the above ROM or the storage section 160 is executed by the above CPU, the control unit 100 functions as a control section 101, a display control section 102, an acceptance section 103, a communication control section 104, and an authenticating section 105. Alternatively, each of the control section 101, the display control section 102, the acceptance section 103, the communication control section 104, and the authenticating section 105 of the control unit 100 may not be implemented by the operation of the control unit 100 in accordance with the information processing apparatus control program but may be constituted by a hardware circuit.

The control section 101 governs the overall operation control of the image forming apparatus 10. The control section 101 is connected to the image reading section 110, the image forming section 120, the display section 130, the touch panel 140, the operating section 150, the storage section 160, the communication section 170, and so on. The control section 101 performs the operation control of the above components connected thereto and signal or data transfer to and from the components.

The display control section 102 has the function of controlling the display operation of the display section 130.

The acceptance section 103 has the function of accepting, based on a touch gesture on the touch panel 140, a selection of one of main operating keys arranged in a main operating image displayed on the display section 130. Thus, the acceptance section 103 accepts an instruction relating to a piece of processing corresponding to the selected main operating key and executable on the image forming apparatus 10, such as an instruction to enter a character or an instruction to perform image formation. Furthermore, although details will be given later, the acceptance section 103 also has the function of, based on not only a touch gesture on the touch panel 140 of the image forming apparatus 10 but also a touch gesture on a touch panel 220 of the mobile terminal device 20, accepting an instruction relating to processing executable on the image forming apparatus 10.

The communication control section 104 has the function of controlling the communication section 170 to allow the communication section 170 to transfer data to and from the mobile terminal device 20 and so on.

The authenticating section 105 has the function of determining, based on an authentication request sent from the mobile terminal device 20, whether or not to authenticate that the acceptance section 103 accepts operating information to be sent from the mobile terminal device 20. The detailed contents of the operating information will be described hereinafter.

Figure 3A:
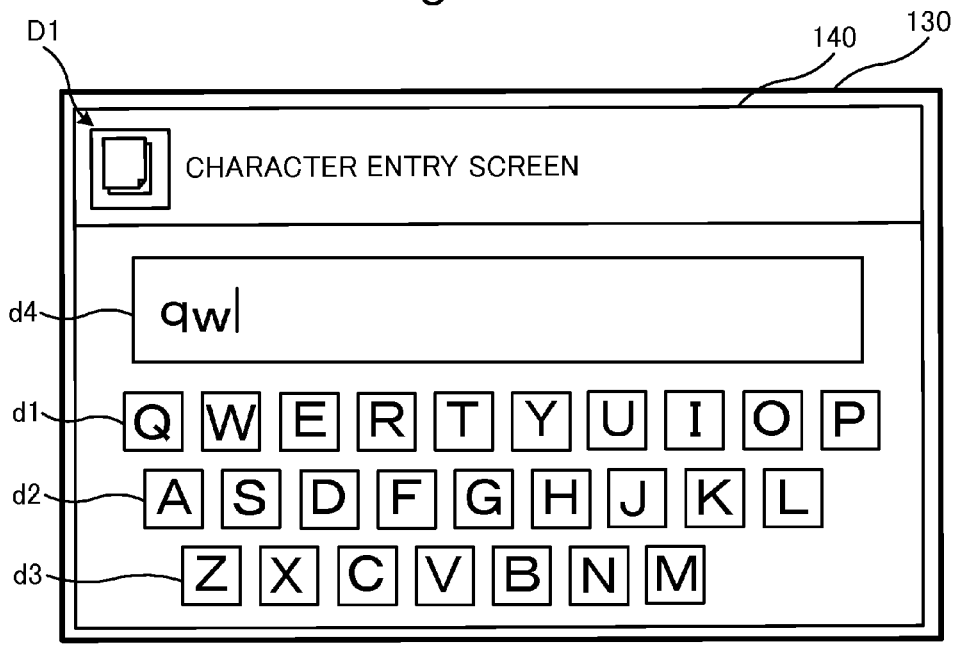
FIGS. 3A and 3B show examples of main operating images displayed on a display section of an image forming apparatus according to the one embodiment of the present disclosure.
Figure 3B:
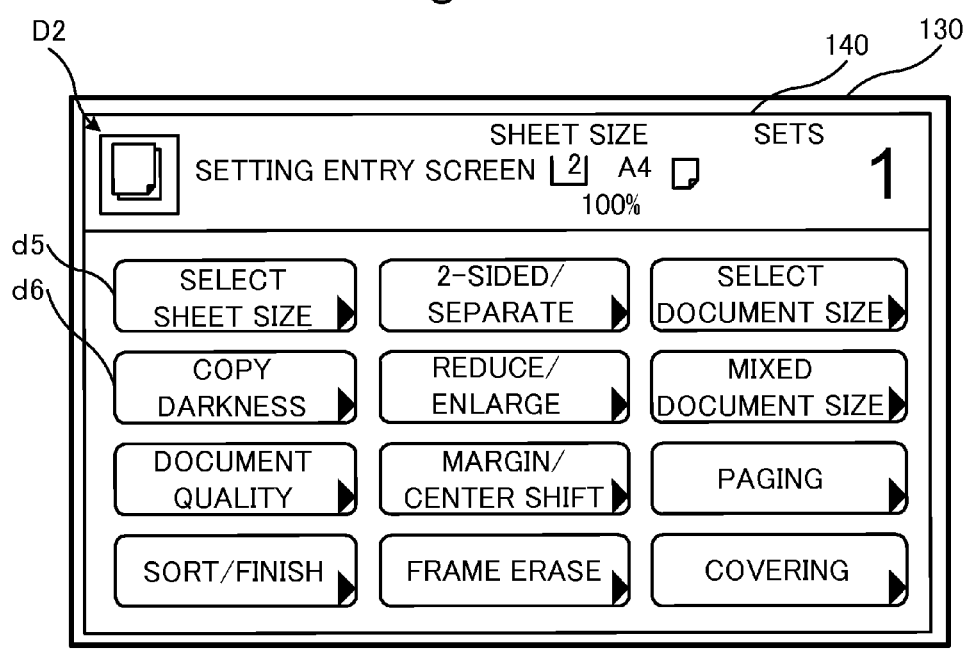

Next, a description will be given of main operating images displayed on the display section 130. FIGS. 3A and 3B show examples of main operating images displayed on the display section 130. A main operating image D1 shown in FIG. 3A is an operating image for acceptance of character entry and contains character entry keys d1, d2, d3, a character display field d4, and so on arranged therein. The character entry keys d1, d2, and d3 are associated with individual instructions to enter lower-case alphabet characters "q", "a", and "z", respectively. The characters entered by selecting from the character entry keys d1, d2, d3, and so on are displayed in the character display field d4.

A plurality of instruction keys are arranged in a main operating image D2 shown in FIG. 3B and associated with individual instructions relating to image formation or image reading. For example, the instruction keys provided in the main operating image D2 include a sheet select key d5 associated with an instruction to select a recording paper sheet subject to image formation and a copy darkness key d6 associated with an instruction to select a copy darkness.

As shown in FIGS. 3A and 3B, there are a plurality of main operating images to be displayed by the display section 130. Among the plurality of main operating images, a main operating image corresponding to an instruction accepted by the acceptance section 103 is displayed on the display section 130. For example, when the acceptance section 103 accepts an instruction to enter a character, the main operating image D1 shown in FIG. 3A is displayed on the display section 130 under the control of the display control section 102. For another example, when the acceptance section 103 accepts an instruction to enter setting relating to image formation, the main operating image D2 shown in FIG. 3B is displayed on the display section 130 under the control of the display control section 102.

The character entry keys d1, d2, d3 and instruction keys d5, d6 arranged in the above-described main operating images D1, D2 correspond to main operating keys with which individual instructions relating to pieces of processing executable on the image forming apparatus 10 are associated. The acceptance section 103 accepts, based on a touch gesture on the touch panel 140, a selection of one of the main operating keys and thus accepts an instruction corresponding to the selected main operating key, such as an instruction to enter a character or an instruction to perform image formation.

Next, a description will be given of the structure and configuration of the mobile terminal device 20. The mobile terminal device 20 is a mobile device such as a smartphone and includes a control unit 200, a display section 210, a touch panel 220, a storage section 230, a communication section 240, and so on.

The display section 210 is formed of a liquid crystal display, an organic light-emitting diode display or the like. The display section 210 is configured to, under the control of a display control section 202 to be described hereinafter, display a sub operating image (second operating image) in which a plurality of sub operating keys (second operating keys) are arranged as soft keys or other images. The sub operating keys are operating keys, such as a shift key or a control key, each operable in combination with any main operating key displayed on the display section 130 of the image forming apparatus 10. The display control section 202 to be described hereinafter is configured to allow the display section 210 to display a sub operating image in which sub operating keys indicated in operating key information indicating a list of sub operating keys sent from the image forming apparatus 10 are arranged.

The touch panel 220 is disposed in front of the display section 210 and configured to, when detecting a user's touch thereon, output a signal indicating a coordinate point of the point of touch to a hereinafter described acceptance section 203 and so on.

The storage section 230 is a large storage device, such as an HDD.

The communication section 240 is a network interface composed of a communication module, such as a wireless LAN chip.

The control unit 200 is composed of a CPU, a RAM, a ROM, and so on. When a mobile terminal device control program stored in the above ROM or the storage section 230 is executed by the above CPU, the control unit 200 functions as a control section 201, a display control section 202, an acceptance section 203, and a communication control section 204. Alternatively, each of the control section 201, the display control section 202, the acceptance section 203, and the communication control section 204 of the control unit 200 may not be implemented by the operation of the control unit 200 in accordance with the mobile terminal device control program but may be constituted by a hardware circuit.

The control section 201 governs the overall operation control of the mobile terminal device 20. The control section 201 is connected to the display section 210, the touch panel 220, the storage section 230, the communication section 240, and so on. The control section 201 performs the operation control of the above components connected thereto and signal or data transfer to and from the components.

The display control section 202 has the function of controlling the display operation of the display section 210.

The acceptance section 203 has the function of accepting, based on a touch gesture on the touch panel 220, a selection of one of sub operating keys arranged in a sub operating image displayed on the display section 210.

The communication control section 204 has the function of controlling the communication section 240 to allow the communication section 240 to transfer data to and from the image forming apparatus 10.

Figure 4A:
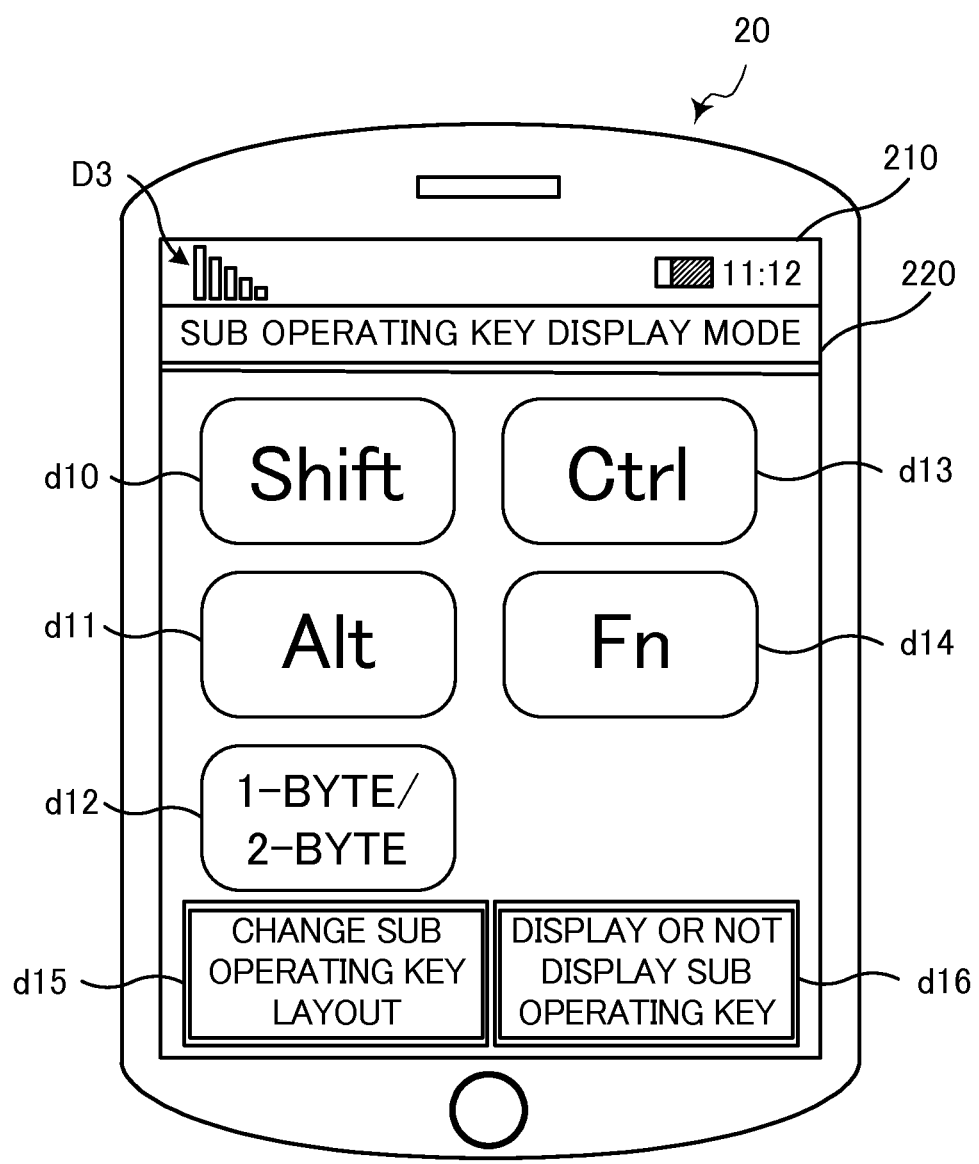
FIGS. 4A and 4B show examples of sub operating images displayed on a display section of a mobile terminal device according to the one embodiment of the present disclosure.
Figure 4B:
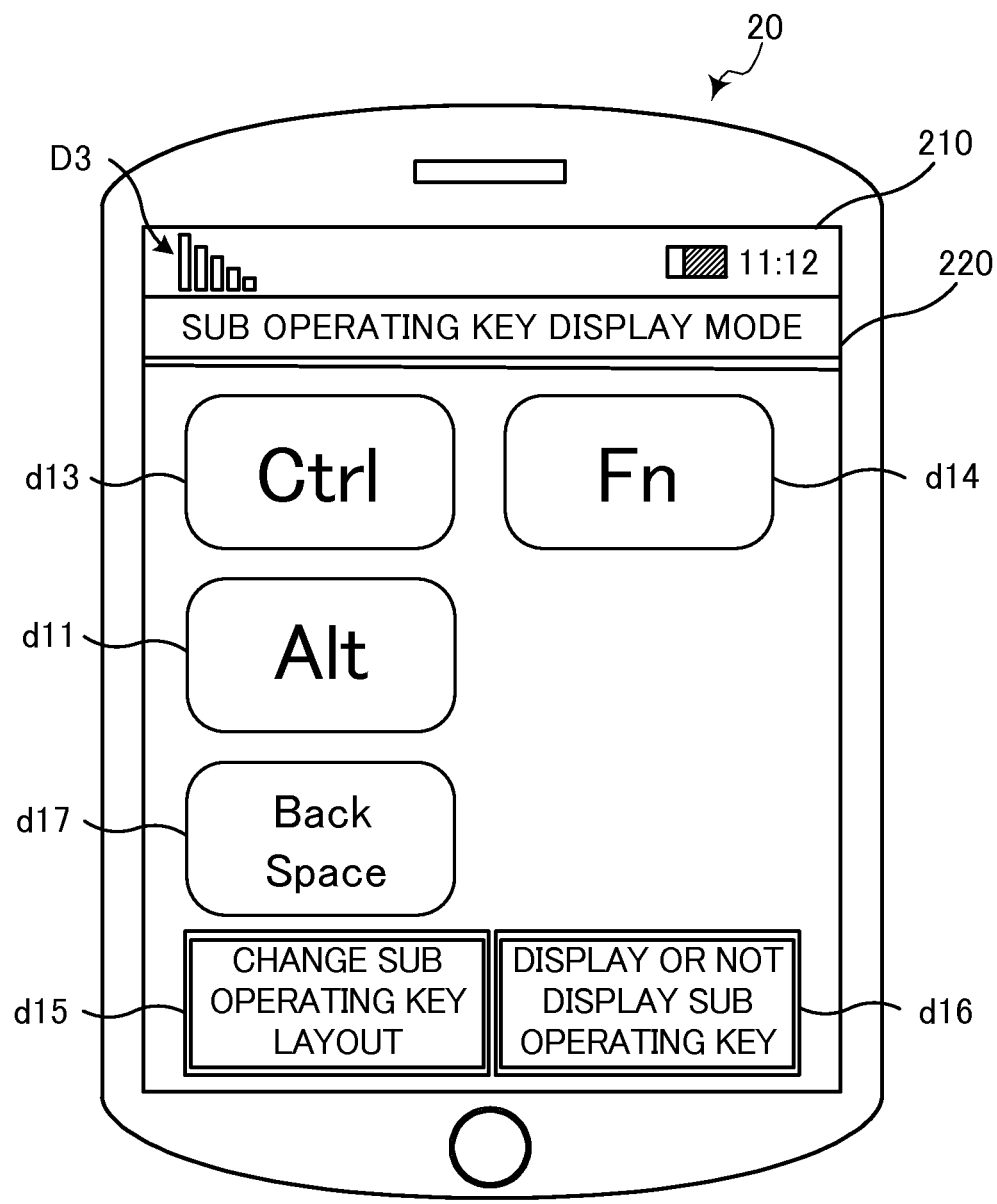

Next, a description will be given of sub operating images displayed on the display section 210. FIGS. 4A and 4B show examples of sub operating images displayed on the display section 210. A sub operating image D3 shown in FIG. 4A contains sub operating keys each operable in combination with any main operating key. The sub operating keys arranged in the sub operating image D3 include a Shift key d10, an Alt key d11, a 1-byte/2-byte key d12, a control (Ctrl) key d13, and a function (Fn) key d14.

Furthermore, also arranged in the sub operating image D3 are an instruction key d15 for acceptance of an instruction to change the layout of sub operating keys and an instruction key d16 for acceptance of an instruction to switch between display and non-display of the individual sub operating keys. When the acceptance section 203 accepts the selection of the instruction key d15, the mobile terminal device 20 becomes ready to accept a position change of at least one sub operating key in the sub operating image D3. When in this state dragging at least one sub operating key which a user desires to change in position, the user can move the sub operating key to a desired position. Based on the instruction to change the layout of sub operating keys accepted by the acceptance section 203, the display control section 202 allows the display section 210 to display a sub operating image in which the layout of sub operating keys has been changed. In the example shown in FIG. 4B, the positions of some sub operating keys, including the control key d13 and the function key d14, are changed from the state shown in FIG. 4A.

Figure 5:
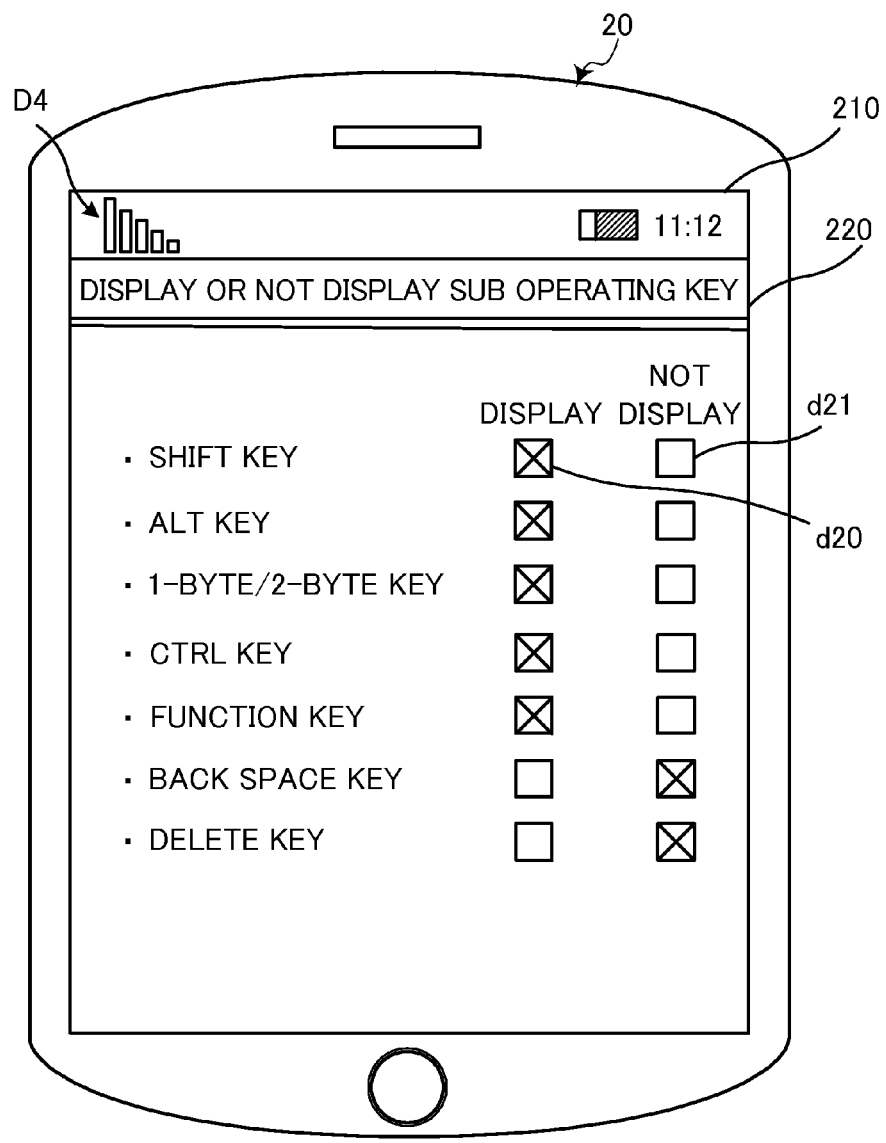
FIG. 5 shows an example of a setting screen displayed on the display section of the mobile terminal device according to the one embodiment of the present disclosure.

On the other hand, when the acceptance section 203 accepts the selection of the instruction key d16, the mobile terminal device 20 becomes ready to accept the switch between display and non-display of the individual sub operating keys in the sub operating image D3. When the acceptance section 203 accepts the selection of the instruction key d16, the display control section 202 allows the display section 210 to display a setting screen for use in accepting the switch between display and non-display of the individual sub operating keys. FIG. 5 shows an example of a setting screen displayed on the display section 210. In the example shown in FIG. 5, a list of sub operating keys indicated in the operating key information sent from the image forming apparatus 10, check boxes d20, d21 for use in switching between display and non-display of the individual sub operating keys, and so on are arranged in the setting screen D4. The acceptance section 203 is configured to accept, based on a touch gesture on the setting screen, an instruction to switch between display and non-display of the individual sub operating keys. Based on the instruction to switch between display and non-display of the individual sub operating keys accepted by the acceptance section 203, the display control section 202 allows the display section 210 to display a sub operating image in which the display/non-display of the individual sub operating keys has been changed. In the example shown in FIG. 4B, unlike the state shown in FIG. 4A, the Shift key d10 and the 1-byte/2-byte key d12 are not displayed but a Back Space key d17 is newly displayed.

Figure 6A:
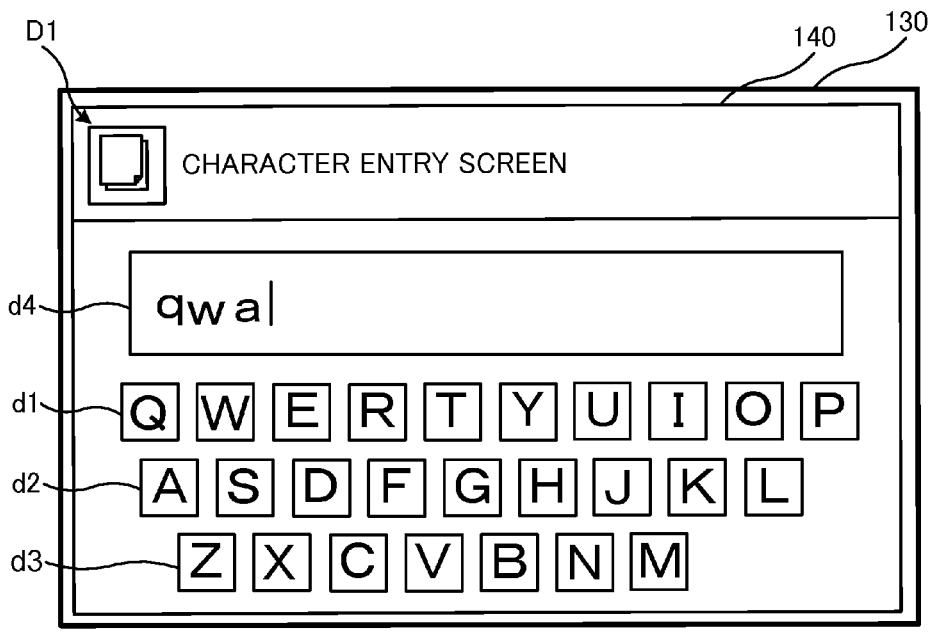
FIGS. 6A and 6B show examples of the main operating images displayed on the display section of the image forming apparatus according to the one embodiment of the present disclosure by touch gestures on the image forming apparatus and the mobile terminal device according to the one embodiment of the present disclosure.
Figure 6B:
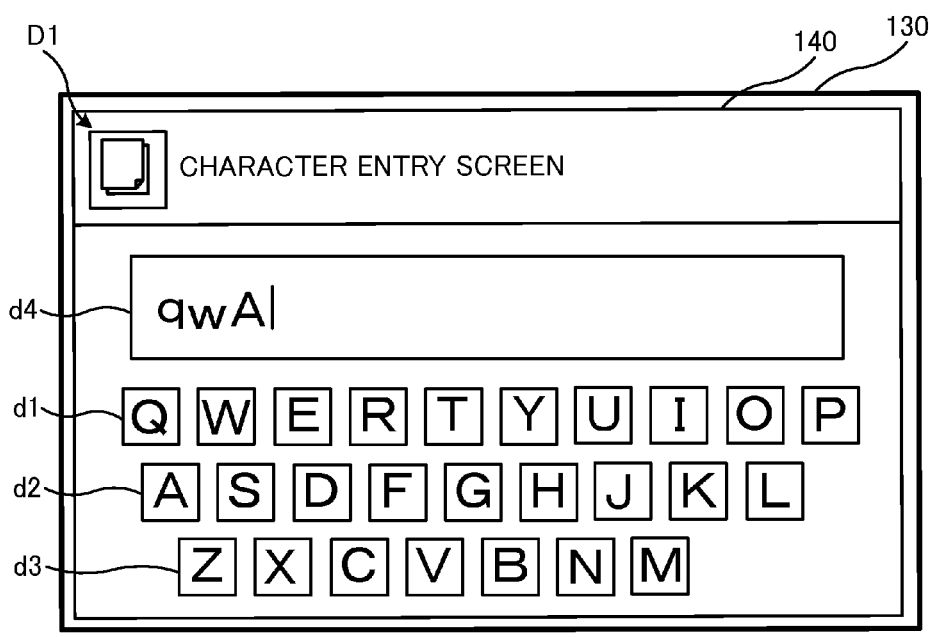

Next, a description will be given of an instruction accepted by the acceptance section 103 by touch gestures on the image forming apparatus 10 and the mobile terminal device 20. FIGS. 6A and 6B show examples of the main operating images displayed on the display section 130 by touch gestures on the image forming apparatus 10 and the mobile terminal device 20. When the main operating image D1 shown in FIG. 3A is displayed on the display section 130 and in this state the character entry key d2 is selected (pushed) by a touch gesture on the touch panel 140, the acceptance section 103 accepts an instruction to enter a lower-case alphabet character "a" associated with the character entry key d2. In this case, the display control section 102, as shown in FIG. 6A, allows the display section 130 to display the lower-case alphabet character "a" in the character display field d4.

On the other hand, when the Shift key d10 is selected by a touch gesture on the touch panel 220, the communication control section 204 of the mobile terminal device 20 allows the communication section 240 to send to the image forming apparatus 10 operating information indicating that the Shift key d10 has been selected. When the character entry key d2 is selected by a touch gesture on the touch panel 140 while the communication section 170 of the image forming apparatus 10 receives the operating information, the acceptance section 103 accepts an instruction corresponding to a combination of the character entry key d2 and the Shift key d10 which is a sub operating key indicated in the operating information. In other words, the acceptance section 103 accepts an instruction to enter an upper-case alphabet character "A" based on a lower-case alphabet character "a" associated with the character entry key d2. In this case, the display control section 102, as shown in FIG. 6B, allows the display section 130 to display the upper-case alphabet character "A" in the character display field d4.

Generally, a display section 130 mounted on an image forming apparatus 10 is often small. In such a case, in order to avoid that the size of the main and sub operating keys is reduced to decrease visibility and operability, it can be considered, for example, that a group of main operating keys and a group of sub operating keys are arranged in different operating images and the display is switched between the operating image containing the group of main operating keys and the operating image containing the group of sub operating keys. For example, in the previously described general technique A, in operating a sub operating key, it is necessary to perform a slide gesture on an operating image to display another operating image. This operating manner, however, is significantly different from a general operating manner in which an instruction corresponding to a combination of a main operating key and a sub operating key is entered by selecting the main operating key while selecting (pushing) the sub operating key. Therefore, the general technique A has an operability giving the user a feeling of strangeness.

Unlike the above, in the present disclosure, an instruction corresponding to a combination of a main operating key and a sub operating key can be entered in a similar manner to the general operating manner in which the main operating key is selected with the selection of the sub operating key. Therefore, the user is less likely to be given a feeling of strangeness in terms of operability.

On the other hand, if a group of main operating keys and a group of sub operating keys are arranged in the same operating image, it is necessary to concurrently detect the selection of a main operating key and the selection of a sub operating key. Therefore, the touch panel 140 disposed in front of the display section 130 needs to be a touch panel capable of detecting multiple simultaneous touches. The touch panel capable of detecting multiple simultaneous touches is higher in production cost than a touch panel capable of detecting a single touch only, resulting in increased production cost of the image forming apparatus 10.

Unlike the above, in the present disclosure, even if the touch panel 140 is a touch panel capable of detecting a single touch only, an instruction corresponding to a combination of a main operating key and a sub operating key can be accepted. Therefore, the production cost of the image forming apparatus 10 can be reduced.

Next, a description will be given of the operations of the image forming apparatus 10 and the mobile terminal device 20 which have the above-described configurations. FIG. 7 is a flowchart showing operation flows of the image forming apparatus 10 and the mobile terminal device 20.

First, a description will be given of the operation flow of the image forming apparatus 10. As shown in FIG. 7, the control section 101 of the image forming apparatus 10 determines whether or not the operation mode of the image forming apparatus 10 is a sub operating key acceptance mode in which operating information on a sub operating key can be accepted from the mobile terminal device 20 (step S10). When the acceptance section 103 accepts, based on a touch gesture on the touch panel 140, an instruction to make transition to the sub operating key acceptance mode, the control section 101 switches the operation mode of the image forming apparatus 10 to the sub operating key acceptance mode.

If the operation mode is the sub operating key acceptance mode (YES in step S10), the communication control section 104 allows the communication section 170 to receive an authentication request sent from the mobile terminal device 20 in the processing in step S31 to be described hereinafter (step S11). The authentication request contains, for example, a password entered on the mobile terminal device 20. The authenticating section 105 verifies the authenticity of the mobile terminal device 20 by determining whether or not the password contained in the authentication request coincides with a password previously stored in the storage section 160 or the like (step S12).

If the authentication of the mobile terminal device 20 is unsuccessful (NO in step S12), the image forming apparatus 10 ends the processing. On the other hand, when the authentication of the mobile terminal device 20 is successful (YES in step S12), the communication control section 104 allows the communication section 170 to send to the mobile terminal device 20 a notification signal indicating a successful authentication (step S13). Furthermore, when the authenticating section 105 authenticates the mobile terminal device 20, the acceptance section 103 becomes ready to accept operating information sent from the authenticated mobile terminal device 20.

The communication control section 104 allows the communication section 170 to send to the mobile terminal device 20 operating key information indicating a list of sub operating keys operable in combination with main operating keys arranged in, among a plurality of main operating images to be displayed by the display section 130, a main operating image displayed on the display section 130 in the processing in step S15 (step S14). When the display section 130 displays another main operating image after the processing in step S14, the communication control section 104 allows the communication section 170 to send again to the mobile terminal device 20 operating key information indicating a list of sub operating keys operable in combination with main operating keys arranged in the other main operating image. For example, when the main operating image displayed on the display section 130 is changed from the main operating image D1 shown in FIG. 3A to the main operating image D2 shown in FIG. 3B, the communication control section 104 allows the communication section 170 to send to the mobile terminal device 20 operating key information indicating a list of sub operating keys, including the function key, operable in combination with the sheet select key d5 or the copy darkness key d6 arranged in the main operating image D2.

After the processing in step S14, the display control section 102 allows the display section 130 to display the main operating image (step S15).

Thereafter, when the acceptance section 103 accepts, based on a touch gesture on the touch panel 140, the selection of a main operating key (YES in step S16), the acceptance section 103 accepts an instruction corresponding to the main operating key the selection of which has been accepted (step S17).

Then, an execution section, such as the control section 101 or the display control section 102, executes the instruction accepted in step S17 (step S18). For example, when a character entry instruction to enter a character is accepted in step S17, the display control section 102 allows the display section 130 to display the character for which the character entry instruction has been accepted. For another example, when an instruction to perform image formation is accepted in step S17, the control section 101 controls the image forming section 120 and so on to form an image on a recording paper sheet.

On the other hand, when the communication section 170 receives operating information sent from the mobile terminal device 20 in the processing in step S36 to be described hereinafter (step S19) and in this state the acceptance section 103 accepts the selection of a main operating key by a touch gesture on the touch panel 140 (YES in step S20), the acceptance section 103 accepts an instruction corresponding to a combination of the main operating key the selection of which has been accepted and the sub operating key indicated in the operating information received in the processing in step S19 (step S21). Then, an execution section, such as the control section 101 or the display control section 102, executes the instruction accepted in step S21 (step S22).

To put the processing in steps S16 and S17 another way, when accepting the selection of a main operating key while the communication section 170 has not received operating information sent from the mobile terminal device 20, the acceptance section 103 accepts an instruction corresponding to the selected main operating key.

After the processing in step S22, the control section 101 determines whether or not the sub operating key acceptance mode has finished (step S23). If the sub operating key acceptance mode has not finished (NO in step S23), the processing returns to step S16. On the other hand, if the sub operating key acceptance mode has finished (YES in step S23), the image forming apparatus 10 ends the processing.

Next, a description will be given of the operation flow of the mobile terminal device 20. As shown in FIG. 7, the control section 201 of the mobile terminal device 20 determines whether or not the operation mode of the mobile terminal device 20 is a sub operating key entry mode in which a sub operating key is entered (step S30). When the acceptance section 203 accepts, based on a touch gesture on the touch panel 220, an instruction to make transition to the sub operating key entry mode, the control section 201 switches the operation mode of the mobile terminal device 20 to the sub operating key entry mode.

If the operation mode is the sub operating key entry mode (YES in step S30), the communication control section 204 allows the communication section 240 to send to the image forming apparatus 10 an authentication request containing a password and so on for use in authenticating the mobile terminal device 20 (step S31).

After the sending of the authentication request, the communication control section 204 allows the communication section 240 to receive the notification signal indicating a successful authentication sent from the image forming apparatus 10 in the processing in step S13 (step S32).

Furthermore, the communication control section 204 allows the communication section 240 to receive the operating key information sent from the image forming apparatus 10 in the processing in step S14 (step S33).

After the processing in step S33, the display control section 202 allows the display section 210 to display a sub operating image in which sub operating keys indicated in the operating key information received in the processing in step S33 are arranged (step S34).

When, after the display of the sub operating image, the acceptance section 203 accepts the selection of a sub operating key by a touch gesture on the touch panel 220 (YES in step S35), the communication control section 204 allows the communication section 240 to send to the image forming apparatus 10 operating information indicating that the sub operating key has been selected (step S36).

After the processing in step S36, the control section 201 determines whether or not the sub operating key entry mode has finished (step S37). If the sub operating key entry mode has not finished (NO in step S37), the processing returns to step S35. On the other hand, if the sub operating key entry mode has finished (YES in step S37), the mobile terminal device 20 ends the processing.

The present disclosure is not limited to the structure of the above embodiment and can be modified in various ways. For example, although the description of the above embodiment has been given taking an image forming apparatus as an example of the information processing apparatus according to the present disclosure, the example is merely illustrative and the present disclosure is not necessarily limited to this case. The information processing apparatus according to the present disclosure may be applied to various industrial machines other than the image forming apparatus.

Furthermore, the information processing apparatus control program, the mobile terminal device control program, or so on described in the above embodiment and modifications may be that recorded on a computer-readable non-transitory recording medium, such as a hard disk, a CD-ROM, a DVD-ROM or a semiconductor memory. In this case, the computer-readable non-transitory recording medium with the information processing apparatus control program, the mobile terminal device control program or so on recorded thereon is one embodiment of the present disclosure.

The configuration and processing shown in the above embodiment with reference to FIGS. 1 to 7 is merely illustrative of the present disclosure and not intended to limit the present disclosure to the above particular configuration and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An information processing system comprising an information processing apparatus and a mobile terminal device, wherein the information processing apparatus comprises:

a first display section capable of displaying a first operating image in which a character entry key for use in character entry on the information processing apparatus is arranged;

a first touch panel disposed in front of the first display section;

a first acceptance section configured to accept, based on a touch gesture on the first touch panel, an instruction relating to processing executable on the information processing apparatus;

a first communication section capable of communicating with the mobile terminal device capable of displaying a second operating image in which a shift key operable in combination with the character entry key is disposed, the mobile terminal device capable of accepting a touch gesture thereon; and a first communication control section configured to control a communication operation of the first communication section, the first communication control section is further configured to allow the first communication section to receive operating information indicating that the shift key has been selected, the operating information being sent from the mobile terminal device to the information processing apparatus, at timing that the shift key displayed on the mobile terminal device is selected by the touch gesture on the mobile terminal device, the first acceptance section is further configured to, when one of the character entry keys is selected by the touch gesture on the first touch panel while the operating information indicating that the shift key has been selected has not been sent from the mobile terminal device to the information processing apparatus and the communication section has not received the operating information, accept an instruction to enter a character associated with the selected character entry key and, when one of the character entry keys is selected by the touch gesture on the first touch panel while the operating information indicating that the shift key has been selected is sent from the mobile terminal device and the communication section receives the operating information, accept an instruction to enter an upper-case alphabet character for the character associated with the selected character entry key the mobile terminal device comprises:

a second communication section capable of communicating with the information processing apparatus;

a second communication control section configured to control a communication operation of the second communication section;

a second display section capable of displaying the second operating image;

a second display control section configured to control a display operation of the second display section;

a second touch panel disposed in front of the second display section; and a second acceptance section configured to accept, based on a touch gesture on the second touch panel, a selection of the shift key, and the second communication control section is further configured to, at timing that the second acceptance section accepts the selection of the shift key, allow the second communication section to send, to the information processing apparatus from the mobile terminal device, the operating information indicating that the shift key has been selected.

* * * * *